Patented Feb. 6, 1923.

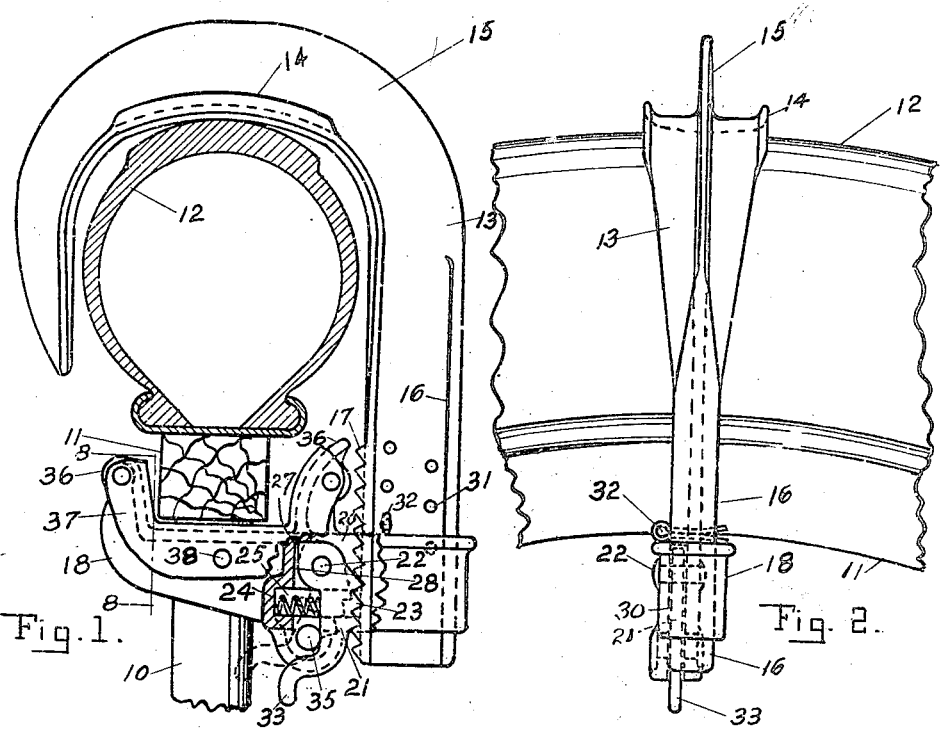
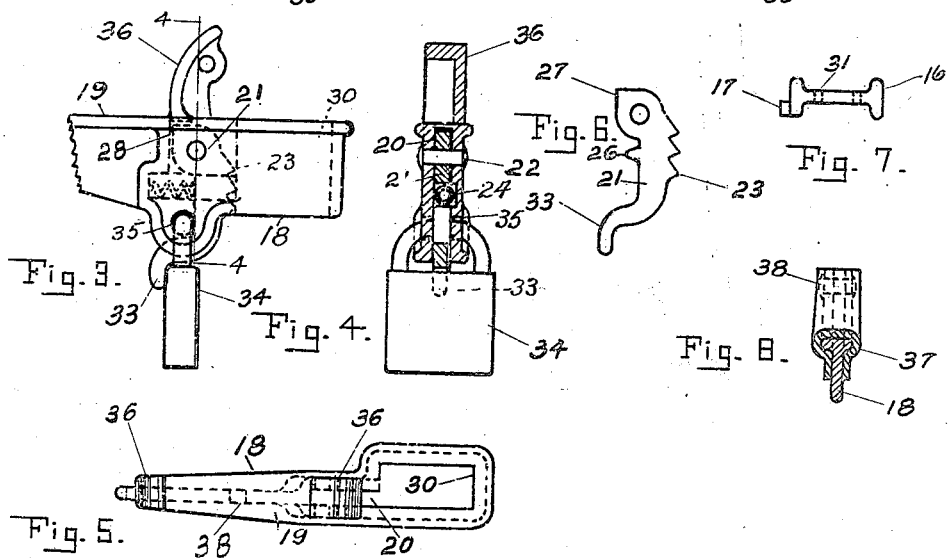

1,444,182

UNITED STATES PATENT OFFICE.

CARL C. GRAY, OF MINNEAPOLIS, MINNESOTA.

MUD HOOK.

Application filed September 24, 1921. Serial No. 502,916.

*To all whom it may concern:*

Be it known that I, CARL C. GRAY, citizen of the United States, residing at Minneapolis, in the county of Hennepin and State of Minnesota, have invented certain new and useful Improvements in Mud Hooks, of which the following is a specification.

This invention relates to a mud hook and particularly to a construction of open hook adapted to be quickly and readily applied to a wheel tire to increase the traction thereof.

The invention has for an object to provide a novel and improved construction comprising a clamping frame adapted to receive the shank of a traction hook and carrying a pawl cooperating with teeth upon said shank.

A further object of the invention is to present a new construction wherein the holding pawl upon the clamping frame is yieldingly forced outward and limited in such movement, while the shank of the traction hook is provided with means to prevent its movement toward the frame when under pressure.

Another object of the invention is to provide a structure by which the traction hook and its clamping frame may be used as a theft lock by the introduction of means to prevent releasing movement of the pawl carried by the frame to engage the shank of the hook.

Other and further objects and advantages of the invention will be hereinafter set forth and the novel features thereof set forth by the appended claims.

In the drawing—

Figure 1 is a side elevation with part of the frame in section;

Figure 2 is an edge view of the invention;

Figure 3 is a detail elevation with the locking means applied;

Figure 4 is a section on line 4—4 of Figure 3;

Figure 5 is a top plan of the frame;

Figure 6 is a detail of the ratchet pawl;

Figure 7 is an end view of the hook shank; and

Figure 8 is a detail section on line 8—8 of Figure 1.

Like numerals refer to like parts in the several figures of the drawing.

The numeral 10 designates a vehicle wheel of any desired construction having the felloe 11 and tire 12 mounted thereon. An open hook 13 partially embraces this tire and has a widened portion 14 engaging the tread thereof. This portion is provided with a central traction rib 15 and the shank 16 of the hook is of I-beam construction and formed with ratchet teeth 17 to cooperate with clamping means.

These means comprise a clamp frame 18 having a plane portion 19 to engage the inner face of the wheel felloe and recessed at 20 to receive the ratchet pawl 21 mounted therein upon the pivot 22. This pawl is formed with ratchet teeth 23 to cooperate with those upon the hook and is normally forced toward said hook by a coiled spring 24 seated at one end is a recess 25 of the frame and embracing at its opposite end a lug 26 upon the pawl. This outward movement of the pawl is limited by a stop wall 27 thereon which contacts with a face 28 of the frame recess 20 so that the pawl is held in proper position after the hook shank is removed from the frame.

This shank extends through a socket 30 of the frame and is provided with a series of adjusting apertures 31 in its web adapted to receive a pin 32 which by engagement with the upper face of the socket limits the movement of the hook toward the frame. This is especially desirable as it prevents a tightening of the parts through pressure on the tire which would be liable to cut or injure the same. The pawl is formed with a releasing handle 33 by which it may be moved inward, as shown by dotted lines in Figure 1, but such movement may be prevented and the hook locked upon the tire by means of a lock device 34 passed through the openings 35 of the frame lugs at the rear of the pawl when in locking position, as shown in Figures 3 and 4.

At each end of the plane portion 19 of the frame guide posts 36 are provided which prevent longitudinal displacement and carry a cushioning pad 37 secured thereto in any desired manner, for instance by rivets 38 passing through apertures in the frame and posts, as illustrated in Figure 8.

The operation of the invention will be apparent from the foregoing description and it will be seen that the device is simply and quickly applied to the wheel from one side thereof by placing the clamp frame beneath the felloe and inserting the shank of the hook therein where it is automatically held in tight engagement with the tire. To prevent further pinching of the hook upon the tire the pin is inserted in the hook shank in position to engage the face of the frame. The parts may be readily released and removed by a withdrawal of the pawl, as shown by dotted lines in Figure 1, and the spring pressure upon the pawl beyond its pivot effects a positive engagement of the holding teeth and prevents slipping of the hook upon the frame. When the lock is applied the device also acts as a theft preventive and can be used for that purpose independent of its functions as a mud hook. The cushioning of the frame at its point of contact with the felloe obviates injury to the parts.

The invention presents a simple, efficient and economically manufactured traction device, and while the details thereof have been specifically shown and described the invention is not confined thereto.

What I claim is:

1. A hook member having a shank provided with ratchet teeth, a clamping frame adapted to receive said shank, and a ratchet pawl mounted in the frame and yieldingly forced toward said teeth.

2. A hook member having a shank provided with ratchet teeth, a clamping frame adapted to receive said shank, a ratchet pawl mounted in the frame and yieldingly forced toward said teeth, and means upon the shank to limit the movement of the hook toward the frame.

3. A hook member having a shank provided with ratchet teeth, a clamping frame having a socket to receive said shank, a ratchet pawl pivoted in the frame, a spring disposed to retain said pawl in contact with said teeth, and means upon said pawl to engage said frame and limit the outward movement of the pawl.

4. A hook member adapted to embrace a tire and having a shank provided with ratchet teeth, a clamping frame having a felloe engaging face and a socket to receive said shank, a toothed pawl pivoted at one end within said frame, a tension spring disposed intermediate the ends of the pawl, and a releasing handle upon the free end of said pawl.

5. A hook member adapted to embrace a tire and having a shank provided with ratchet teeth, a clamping frame having a felloe engaging face and a socket to receive said shank, a toothed pawl pivoted at one end within said frame, a tension spring disposed to retain said pawl in holding engagement, a releasing handle at the free end of said pawl, and an apertured portion upon the frame to receive locking means engaging said handle.

6. A hook member adapted to embrace a tire and having a shank provided with ratchet teeth and a series of apertures, a clamping frame having a socket to receive said shank, a yieldingly held pawl in said frame to engage said teeth, and a pin adapted to be inserted in said apertures and engage the face of said socket to limit the movement of the hook toward the same.

7. A hook member adapted to embrace a tire and having a shank provided with holding means, a clamping frame adjustably mounted upon said shank in alinement with the hook and having a seat to engage the inner face of the felloe, and a holding device mounted upon the frame and movable into and out of engagement with the holding means upon the shank.

8. A hook member adapted to embrace a tire and having a shank provided with holding means, a clamping frame having a felloe engaging seat and posts at opposite ends thereof, a cushion upon said seat secured to said frame and posts, and a holding device mounted within the frame to engage the holding means upon the shank.

9. A hook member adapted to embrace a tire and having a shank provided with holding teeth, a clamping frame adapted to engage a felloe and having a socket to receive said shank, a toothed pawl pivoted at one end within said frame and having a stop wall at its pivot to engage the frame, a tension spring seated in a recess in the frame and engaging the pawl intermediate its ends, and a releasing handle at the free end of said pawl.

10. A hook member adapted to embrace a tire and having a shank provided with ratchet teeth, a clamping frame adapted to engage a felloe and having a socket to receive said shank, a toothed pawl pivoted at one end within said frame, a coiled spring disposed between the frame and said pawl, a releasing handle at the free end of the pawl, and an apertured lug from said frame parallel with said handle to receive a locking device therefor.

11. A hook member adapted to embrace a tire and having a shank, a clamping frame thereon having a felloe engaging face, a retaining device for said frame disposed thereon to releasably engage said shank, and means upon said frame to receive a locking member in the path of movement of said device to prevent release thereof.

12. A hook member adapted to embrace a tire, a clamping frame thereon having a felloe engaging face, a retaining pawl for said frame engaging said member, and means upon said frame to receive a locking member to engage and prevent releasing movement of said retaining pawl.

In testimony whereof I affix my signature.

CARL C. GRAY.